United States Patent
Stout et al.

[15] 3,677,014
[45] July 18, 1972

[54] METHOD OF INHIBITING WIND MOVEMENT OF LOOSE PARTICLES FROM SURFACES

[72] Inventors: Caleb M. Stout; Kenneth H. Nimerick; Christ F. Parks, all of Tulsa, Okla.

[73] Assignee: The Dow Chemical Company, Midland, Mich.

[22] Filed: April 2, 1970

[21] Appl. No.: 25,245

[52] U.S. Cl. ...............................................61/36
[51] Int. Cl. ..............................................E02d 3/12
[58] Field of Search ...............................61/36, 35; 166/295

[56] References Cited
UNITED STATES PATENTS

| | | |
|---|---|---|
| 3,021,298 | 2/1962 | Rakowitz ...............................61/36 R |
| 3,286,475 | 11/1966 | Adams ...................................61/36 |
| 3,334,689 | 8/1967 | McLaughlin ..........................166/295 |
| 3,368,356 | 2/1968 | Graf .......................................61/36 R |
| 3,421,584 | 1/1969 | Eilers et al. ..........................166/295 |

*Primary Examiner*—David J. Williamowsky
*Assistant Examiner*—Philip C. Kannan
*Attorney*—Griswold and Burdick and Charles W. Carlin

[57] ABSTRACT

Loose soil or piles or heaps of finely divided material, e.g. tailings of mines, can be inhibited against excessive wind movement by applying to the surface thereof a polyacrylamide, either as a slurry or in dry form on a prewet surface or in admixture with a hygroscopic agent.

6 Claims, No Drawings

METHOD OF INHIBITING WIND MOVEMENT OF LOOSE PARTICLES FROM SURFACES

BACKGROUND OF INVENTION

Wind erosion of loose soil or mine or mill tailings particularly of high silica minerals causes damage to the soil or lessens stability of the tailings and also causes a serious air pollution problem as well as is a direct health hazard and results in deposition of grit on surfaces in the vicinity. For example, in some of the copper mining towns of western United States, such severe contamination of air pollution, health hazard, and lack of freedom from deposits of dust due to wind erosion of mill tailings during dry seasons have occurred that they have seriously disrupted normal living in the vicinity. The dust picked up and borne by winds sweeping across loose soil or such tailings is at times so severe that it constitutes a hazard to automobile traffic on adjacent highways. Methods of controlling the dust by wind from these tailings have been attempted at the expenditure of millions of dollars.

Loose soil subject to movement by wind is a familiar thing and its instability in the face of winds is well known. The tailings are the solids remaining after ore has been removed as by flotation operations. The tailings are often, as in the case of copper mine tailings, extremely fine, at least 80 percent thereof finer than 100 mesh. The tailings are built up or accumulate as a result of solids being pumped at about a 25 to 35 percent solids slurry, from the flotation tanks. As a part of the operation, the liquid portion of the slurry is substantially drained away from the settling pond and returned to the flotation operation. During dry periods in spring and summer, particularly where these areas dry out and there is appreciable wind, many tons of fines are lifted and carried by the air.

Among the efforts to decrease the hazard and pollution resulting from such fines being carried into the air is the use, by the mining companies, is a device known as a water buggy which is a device known as a water buggy which is a self-propelled or power-propelled vehicle which is driven over the tailings and sprays water on the dry areas of the accumulation. This operation is usually continued nearly every day of the week for about seven calendar months of the year at a substantial cost. The result however, has been unsatisfactory.

The inhibition of wind-borne fine particles is also greatly desired from desert hillsides near towns and cities and of finely divided materials such as coal (which contains some dust) lime and the like.

There is, accordingly, a very definite need for an effective method of inhibiting the pollution of air from the accumulations of fine silica, coal, tailings, limestone or other powdery material and deposition thereof on exposed surfaces in the vicinity and thereby to lessen the amount of such material that gets on food and in and on machinery and equipment, that discolors buildings and other structures, and particularly that which is inhaled by animals and people in the vicinity resulting in serious biological effects approaching shear misery at times and ruination of health. (There is also a need to lessen loss of material and contamination due to wind-borne movement from accumulations during industrial processing and storage, and from supply depots, where it is exposed to air currents.) Such material includes tailings and piles of ash or the like of any sort and such bulk chemicals as pulverized limestone and clays.

SUMMARY OF INVENTION

The invention comprises spraying polyacrylamide in a liquid carrier vehicle or applying it in dry form where there is sufficient moisture present, to the surface of an accumulation of fine particulate material to stabilize it and aid in preventing the material from being blown about. The object of the practice of the invention, therefore, is inhibiting contamination of the air and deposition of gritty, often damaging, material on surfaces in the area, which as presently uninhibited constitute a general deterrent to the healthful enjoyment of life.

When the polyacrylamide is not dispersed in a liquid carrier, and the relative humidity is not at least about 50 percent, a hygroscopic material, e.g. $CaCl_2$, urea, $NH_4NO_3$, or $MgCl_2$, is applied on the particulate materials to be stabilized with or immediately following the polyacrylamide, or the surface of the soil or tailings to be stabilized are prewet before application of the polyacrylamide. A further embodiment of the invention is to apply the polyacrylamide in a dry form and thereafter wet the surface of the tailings or soil as by spraying or irrigation.

We have discovered that polyacrylamides, when used in accordance with the invention, swell and imbibe the water and are capable of holding 50 to 250 times the amount of water which can be held by equal amounts of clay (which heretofore has been considered as being illustrative of a material having outstanding swelling and imbibing properties).

Although the practice of the invention has general application to stabilizing soils and heaps of powdery material against movement, it has special application to stabilizing tailings. It is well known by those concerned directly with mining, smelting, and metal refining processes that a typical tailings pond may have surface properties resembling those of quick sand. Such type of surface naturally restricts and may completely prevent the general use of vehicles which otherwise might be operated on the surface for the purpose of spreading clay or clay-like materials (a practice attempted in the past with very limited success).

Although the invention may be practiced by applying the material in dry form as aforesaid by means of surface dusting equipment, or by employing surface spraying apparatuses equipped with hoses, pipes, and the like properly provided as needed with suitable valves, and nozzles, the recommended mode of conducting dust control hereunder is by aerial application. The invention lends itself readily to aerial application because of the low density and lessened quantity of the dust-allaying material employed. When a slurry (more commonly called a solution in the parlance of the art, even though strictly speaking it is not always a true solution) is forced under pressure through suitably arranged hoses and nozzles which may be of conventional design well known to aerial spraying operations, whereunder a relatively uniform pattern of application on an accumulation or pile of finely particulated material is attained, there results the formation of a protective film or layer on the exposed surface of the finely divided material. The concentration of the polyacrylamide in a liquid vehicle may be between about 0.001 and 1.0 parts, by weight of liquid present. The polyacrylamide employed may be prepared by any of the known processes. The molecular weight or extent of hydrolysis (i.e. conversion of carboxamide group to carboxylic groups) of the polyacrylamide are not highly critical, as will be shown by examples set out hereinafter.

Polyacrylamide having an average particle size of between about 75 microns and 100 microns and a relatively small amount thereof usually being in excess of 150 microns, any of which are commercially available, may be employed in the practice of the invention, the following are illustrative:

A. A water-soluble polyacrylamide having less than 1 percent hydrolysis, a 0.45 percent solution thereof having a viscosity in deionized water of about 18 centipoises when measured at 25° C.;

B. A water-soluble polyacrylamide having about 20 percent hydrolyzed, a 0.40 percent polymer solution thereof having a viscosity in 4 percent NaCl solution of about 32 centipoises when measured at a pH of 7.0 and at 25° C.;

C. A water-soluble polyacrylamide having about 20 percent hydrolyzed, a 0.25 percent polymer solution thereof in a 4 percent NaCl solution having a viscosity of about 12 centipoises when measured at a pH of 7.0 and temperature of 25° C.;

D. A water-soluble polyacrylamide having about 20 percent hydrolyzed, a 0.40 percent polymer solution thereof in 4 percent sodium chloride solution having a viscosity of about 25 centipoises when measured at a pH of 7.0 and at 25° C.;

E. A water-swellable cross-linked polyacrylamide having about 30 percent hydrolyzed, whose 70 mesh fraction will pick up 140 to 200 times its weight of synthetic hard water (made by dissolving 0.30 gram of $CaCl_2$ and 0.50 gram of NaCl in 1 liter of distilled water) in 1 minute.

Viscosity values set out above were determined by use of an Ostwald Viscosimeter.

The molecular weight of the polyacrylamide employed is usually somewhere between about 100,000 and about 4,000,000, that usually employed being between about 1,000,000 and about 3,000,000. The polyacrylamide prepared according to U.S. Pat. No. 3,478,003 is quite suitable for the practice of the invention.

A penetration into the tailings of about 0.25 millimeter by the applied polyacrylamide solution is adequate although a penetration of at least about 1 millimeter is recommended and, but only for economic reasons, much greater penetration is quite acceptable, there being actually no maximum limit for the depth of penetration. It is recommended that the consistency and viscosity of the polyacrylamide solution be sufficiently low that it may be readily applied, employing selected spray apparatus, but the viscosity sufficiently high that it not drain away or run along the surface excessively after it contacts the accumulation of particulate material applied thereon for the purpose of inhibiting the material from being airborne.

EXAMPLES OF THE INVENTIONS AND COMPARATIVE TESTS

Example 1

A section of a mine tailings pond in connection with a large copper producing operation in the state of Utah was selected for this test because dust blowing from this tailings pond had been a continuous hazard to the immediate vicinity for a long period of time. A polyacrylamide-water blend having a concentration of about 0.0004 part by weight (about 2 3/4 pounds/1,000 gallons of polyacrylamide) was applied to the surface of the selected section of the pond. The applied composition contained a red soluble dye for identification purposes. Application was made by the vehicle earlier referred to herein as a water buggy. The test plot was approximately 500 feet by 80 feet, the longer dimension extending northwest to southwest which made it parallel to the prevailing wind (it being from the northwest). A control plot similarly located but untreated was also observed for comparative purposes.

Visual examination of the treated and untreated plots, shortly after the application of the polyacrylamide solution, showed very encouraging absorption of the composition into the tailings which had been treated with the polyacrylamide solution. Observation of the test plot treated according to the invention, after a period of approximately 2 months during which there had been high winds up to 40 miles per hour, showed that the plot which had been treated with the polyacrylamide solution in accordance with the invention, had undergone relatively little disturbance due to the wind. (The only change was that caused by later dumped tailings.) The comparative plot which had not been treated showed extensive disturbance by wind and had been the source of obnoxious dust in the air.

EXAMPLE 2

A different tailings pond (from that used in Example 1) located in the state of Nevada was used to show further the practice of the invention. Five one-acre plots were used. These plots were approximately 500 feet by 80 feet as in Example 1, the longer dimension being parallel to the prevailing south wind.

One plot, i.e. A, was treated according to the invention. On its surface was applied, in a substantially uniform pattern thereover, 50 pounds of polyacrylamide in water (of the concentration employed in Example 1), as explained more fully in the next following paragraph. Four additional plots, B to E, were treated, in a manner of application similar to A, with the following:

B. 50 gallons of 55 percent total solids 50:50 styrene:butadiene latex;

C. 30 gallons of the latex employed on Plot B but admixed with 5 gallons of polyacrylic acid;

D. 25 pounds of polyacrylamide + 5 gallons polyacrylic acid;

E. 50 gallons of water only.

The polymer or synthetic rubber systems were sprayed from a 4,000-gallon tank mounted on a truck and equipped with a centrifugal pump and slotted spray nozzles. A gravity feed spreader-bar was also employed in application of the composition onto the tailings.

After a month had passed the plots were examined. Plot A, which had been treated according to the invention with polyacrylamide, had completely resisted erosion by winds of at least 40 mph. Plots B, C, and D had broken down to some extent, although they were much better than the control Plot E where only water had been used.

After 1 year following treatment, the plots were again examined. Plot A had only a few slightly wind eroded spots. It is estimated that 99 percent control had been obtained. Plot D, whereon a combination of the polyacrylamide and the polyacrylic acid had been used, showed some erosion and was about 75 percent effective. Plots B and C employing either the latex or polyacrylic acid and the latex mixture had deteriorated badly and were rather badly eroded. The control Plot E whereon only water had been used had been severely eroded and were in very bad condition. In many places Plot E had lost 6 to 8 inches of its top soil.

After 16 months from treatment the plots were again examined. The conditions noted above had continued, i.e. Plot A was hardly disturbed whereas the condition of the other plots had grown steadily worse.

Example 3

An active tailings pond (one in continuous use during the test) located in the state of Utah was used in aerial application of dry acrylamide in this example. This test plot consisted of 25 acres in a rectangular shape, the longest dimension running parallel to the prevailing northwest wind. In this example, dry powdered polyacrylamide was applied aerially by helicopter onto wet tailings. The application rate was 50 pounds per acre; the polyacrylamide was applied at about 6 to 10 feet above the tailings surface. The treated tailings became dry within 2 to 3 weeks at which time evaluation was started on the test plot. Evaluation of the test plot was made employing graduated stakes placed within and around the outer perimeter of the test plot and also by visual observation during times when the winds reached greater than 40 mph, clearly a condition conducive to violent dust storms and shifting of the tailings. The stake reading data and the visual observation obtained during high winds indicate that the dry polyacrylamide applied to the wet tailings, although they later became dry, was effective in preventing wind erosion. Test evaluation was continued for 3 months while the tailings remained predominantly dry. During this time very little erosion, even though high winds occurred rather frequently, was noted on the test plot. The test was terminated when the plot became covered by fresh wet tailings resulting from migration of the tailings slurry from the active pond, due to continued use of the pond by the smelter feeding into it.

The examples clearly demonstrate the efficacy of polyacrylamide to stabilize soil against movement by winds.

Having described our invention, that we claim and desire to protect by Letters Patent is:

1. The method of stabilizing the exposed surface of soil or accumulations of finely particulate material against movement and erosion by winds and the resulting contamination of the air and deposition by the winds onto surrounding objects which comprises applying to said exposed surface in the presence of moisture or water, a stabilizing composition comprising polyacrylamide having a molecular weight of between about 100,000 and about 4,000,000 and between about 1 and 70 percent thereof hydrolyzed.

2. The method according to claim 1 wherein said stabilizing composition is applied by aerial spraying.

3. The method according to claim 1 wherein said stabilizing composition is applied as a slurry having a viscosity controlled to a small enough value to allow it to be readily pumped through nozzles and which will penetrate the interstices of the particulate material to be stabilized to sufficient depth to coalesce the particles at the surface but having a viscosity of high enough value to result in an excessive amount thereof not running along or draining away on the surface of the soil or accumulations being stabilized wherein said polyacrylamide is present in an amount ranging from about 0.001 to about 1.0 part by weight of said slurry.

4. The method according to Claim 1 wherein the liquid carrier is selected from the class consisting of water, weak acid solutions, brine, alcohol, oil, light-weight hydrocarbons, chlorinated hydrocarbons and mixtures and emulsions thereof.

5. The method of stabilizing the exposed surfaces of soil or accumulations of finely particulate material against movement and erosion by winds and the resulting contamination of the air and deposition by the winds onto surrounding objects which comprises applying to said exposed surfaces a stabilizing composition comprising polyacrylamide having a molecular weight of between about 100,000 and about 4,000,000 and between about 1 and 70 percent thereof hydrolyzed and wetting said exposed surface together with said stabilizing composition.

6. The method of stabilizing an exposed surface of finely particulate material which comprises:

dusting said exposed surface with finely particulated polyacrylamide having a molecular weight of between about 100,000 and about 4,000,000.

* * * * *